April 24, 1951        E. MITTELMANN        2,550,584
MILK PASTEURIZATION METHOD AND APPARATUS
Filed Feb. 3, 1949
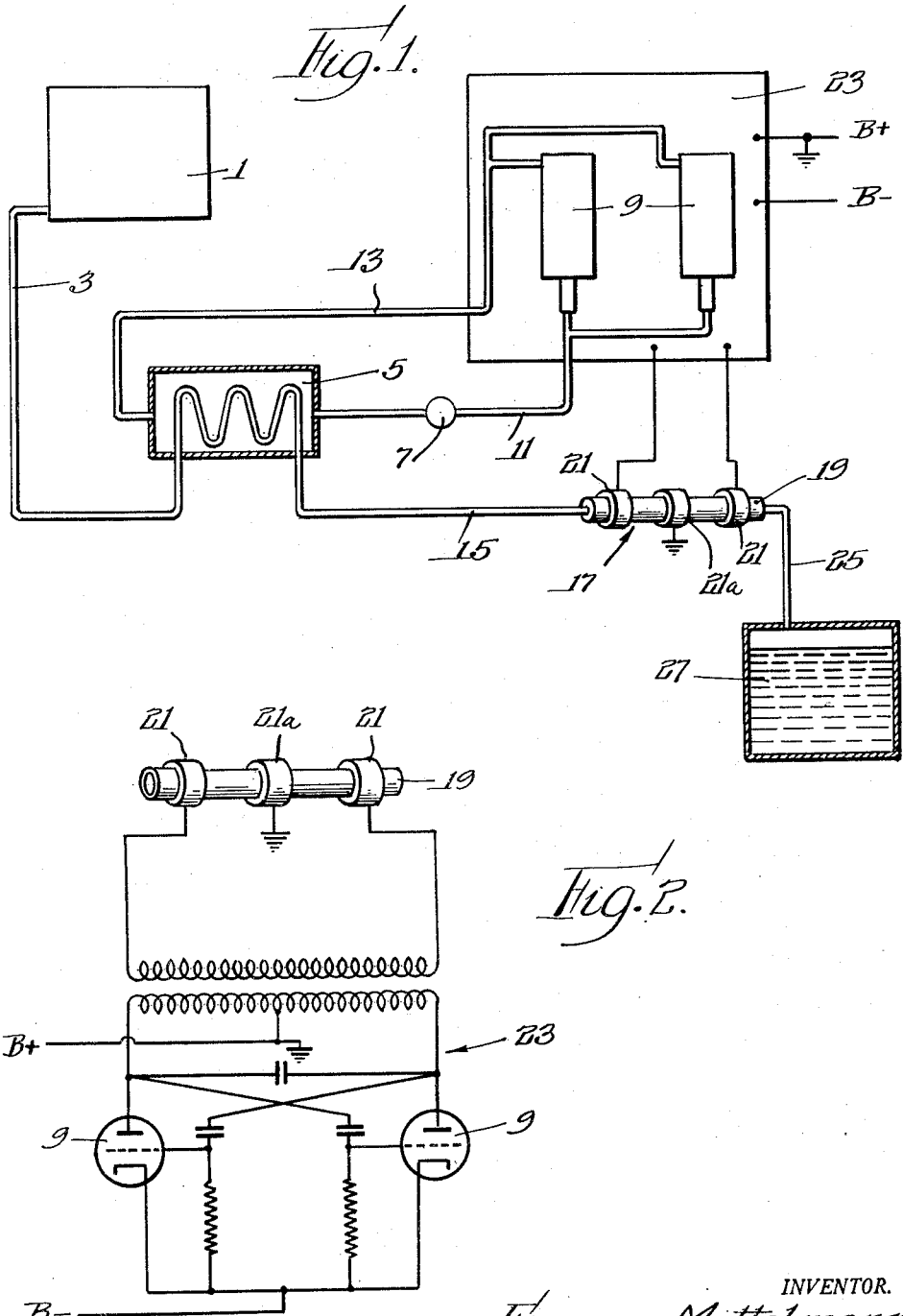
INVENTOR.
Eugene Mittelmann
BY
Moore, Olson & Trexler
attys.

Patented Apr. 24, 1951

2,550,584

UNITED STATES PATENT OFFICE 2,550,584

MILK PASTEURIZATION METHOD AND APPARATUS

Eugene Mittelmann, Chicago, Ill.

Application February 3, 1949, Serial No. 74,453

5 Claims. (Cl. 219—39)

This invention relates to the pasteurization of milk and more particularly to a method of and an apparatus for pasteurizing milk by high frequency electrical heating.

In the pasteurization of milk it is desirable to raise the temperature of milk rapidly to a temperature of 190° F. or above and to keep it there for approximately sixteen seconds. This is generally done by passing the milk between carbon electrodes which are energized from a sixty cycle per second commercial power line. Current passes through the milk between the electrodes and the milk is heated by the dissipation of power in the resistance it offers to the passage of the electric current. This method has a satisfactory electrical efficiency but possesses a number of shortcomings which have kept it from being completely satisfactory. The main disadvantage of this resistance heating is that the milk acquires a cooked taste which is quite undesirable to most consumers. High frequency heating obviates the difficulty of the cooked taste and raises the temperature of the milk quite rapidly, but has been unable to compete commercially with pasteurization by resistance heating heretofore as the high frequency heating is comparatively inefficient, being no higher than 60% to 66% and generally on the order of 50% whereas an efficiency of nearly 100% can be obtained with resistance heating.

This invention contemplates the pasteurization of the milk by high frequency electrical heating, the over-all efficiency of the apparatus approximating 100%. Large quantities of milk are generally pasteurized in a comparatively short time so that for commercial applications large amounts of high frequency power are required and it is consequently necessary to use oscillator tubes requiring forced air or water cooling of the anode. In the normal use of water cooled tubes the cooling water enters the water jacket of the anode at a temperature of about 50° F. to 60° F. depending to some degree on the installation and leaves the water jacket at temperatures as high as 170 F. Large amounts of water are required to properly cool the anodes of large oscillating tubes and rather than dissipating this heat and wasting it as was formerly done the present invention utilizes a closed cooling system in which the cooling water is used to preheat the milk being pasteurized. An oscillator tube with a plate dissipation on the order of fifteen kilowatts will raise the temperature of the cooling water through the previously mentioned range of approximately 60° F. to 170° F. at the rate of about two gallons per minute. It may thus be seen that the cooling water at 170° F. may be used to heat large quantities of milk in a heat exchanger. The temperature of the cooling water is lowered in the heat exchanger and the heated milk is subsequently raised to a still higher temperature in a high frequency capacitive field energized by the oscillator heating the cooling water. As both the electrical output of the oscillator and the heat dissipated at the anodes of the oscillator tubes are utilized it is apparent that overall efficiencies approaching 100% can be obtained.

It is accordingly a primary object of this invention to present an apparatus for the pasteurization of milk by high frequency heating.

A further object of the invention is to provide an apparatus for the pasteurization of milk by high frequency heating in which the heat dissipated at the anodes of the oscillator tubes is utilized so that the over-all efficiency of the apparatus approaches 100%.

Another object of the invention is to provide a method of pasteurizing milk in which the milk is preheated.

This invention is explained in greater particularity in conjunction with the accompanying drawings in which:

Figure 1 is a schematic diagram of the pasteurization apparatus; and

Figure 2 is a schematic diagram of a suitable oscillator and its connections to the electrode structure of the high frequency heater.

Raw milk is supplied from a suitable tank or other source 1 and is fed by gravity or other means through a pipe 3 to a heat exchanger 5. Cooling water is pumped by a pump 7 through a pipe 11 into water jackets of oscillator tubes 9 of a radio frequency oscillator 23 indicated symbolically in Figure 1 from whence it passes into pipe 13 and then into the heat exchanger 5 and finally back through the pump 7. The cooling water is of course heated in the water jackets of the oscillator tubes 9 and is cooled in the heat exchanger 5 with a consequent raising of the temperature of the milk. The milk then passes from the heat exchanger through a pipe 15 to the high frequency heater 17. The high frequency heater comprises a non-conducting cylindrical member 19 and a plurality of electrodes 21 and 21a. In the preferred form of this invention there are three electrodes and the end two 21 are excited by an oscillator 23 while the center electrode 21a is grounded. The milk in the cylindrical member 19 is heated by dielectric loss between the electrodes in a manner which is described with greater particularity in my Patent No. 2,397,615.

From the high frequency heater the milk passes through a pipe 25 into a suitable receptacle 27 where it is chilled prior to distribution. The oscillator 23 can be of any conventional type using water cooled tubes 9 although a push-pull oscillator such as that shown in Figure 2 is preferred for greater efficiency and power output. The oscillator is powered by a suitable potential, B+, in a conventional manner, and for every 20 kilowatts of energy supplied to the oscillator, the apparatus will pasteurize approximately one gallon of milk per minute. In the embodiment shown the B+ supply is grounded to preclude the possibility of a high direct current voltage appearing on the electrodes in the event of a short circuit in the transformer. Although for purposes of illustration the output of the oscillator 23 is shown as being transformer coupled to a pair of ring electrodes 21 with a third ring electrode 21a interposed between them and grounded it is to be understood that other coupling means and other high frequency heaters could be used.

It is thus apparent that an apparatus for the pasteurization of milk by high frequency heating is here presented in which the over-all efficiency of the apparatus approaches 100%. It is further apparent that this high efficiency is achieved by utilizing the anode dissipation of the oscillator tubes to preheat the milk which is then raised to its final high temperature by dielectric loss in a high frequency heater excited by the same oscillator tubes which bring about the preheating.

Although for purposes of illustration a particular embodiment of my invention has been shown and described, it is apparent that various modifications can be made within the spirit and scope of the appended claims.

I claim:

1. An apparatus for the pasteurization of milk, comprising a radio frequency heater for heating the milk by dielectric loss, an oscillator for supplying radio frequency energy to said heater, said oscillator including a fluid cooled electronic tube and a preheater having a fluid connection to said tube utilizing the energy normally dissipated in the tube of said oscillator for preheating the milk.

2. An apparatus for the pasteurization of milk, comprising a radio frequency heater for heating the milk by dielectric loss, an oscillator for supplying radio frequency energy to said heater, said oscillator utilizing liquid cooled electronic tubes, and a preheater including a heat exchanger utilizing said liquid coolant for preheating the milk.

3. An apparatus for the pasteurization of milk comprising a radio frequency heater for heating the milk by dielectric loss, said heater including a plurality of electrodes, a radio frequency oscillator for supplying energy to said electrodes, said oscillator including a liquid cooled electrode, and a closed circulatory system for the coolant for said liquid cooled electrode, said circulatory system including a heat exchanger for preheating the milk and cooling said coolant.

4. An apparatus for the pasteurization of milk, comprising a radio frequency heater for heating the milk by dielectric loss, said heater including a cylindrical member and a plurality of electrodes spaced about its periphery, and an oscillator for supplying energy to said electrodes, said oscillator including a liquid cooled electronic tube and a closed circulatory system for the coolant for said electronic tube, said circulatory system including a heat exchanger for preheating the milk.

5. An apparatus for the pasteurization of milk, comprising a supply source for the milk, receiving means for the milk, and means for conveying the milk from said supply source to said receiving means, said conveying means including heat exchanging means and radio frequency heating means, an oscillator for supplying radio frequency energy to said radio frequency heating means, said oscillator including liquid cooling means, the heat imparted to said liquid cooling means being utilized in said heat exchanger means for preheating the milk.

EUGENE MITTELMANN.

REFERENCES CITED

The following references are of record in the file of this patent:

UNITED STATES PATENTS

| Number | Name | Date |
| --- | --- | --- |
| 1,522,188 | Hull | Jan. 6, 1925 |
| 1,806,846 | Fox et al. | May 26, 1931 |
| 2,188,625 | Dufour et al. | Jan. 30, 1940 |
| 2,256,904 | Kintner | Sept. 23, 1941 |
| 2,303,341 | Dufour et al. | Dec. 1, 1942 |